Jan. 23, 1951          H. R. KREIDER          2,539,022
STAR WHEEL FOR STABLE CLEANERS
Filed Dec. 18, 1946
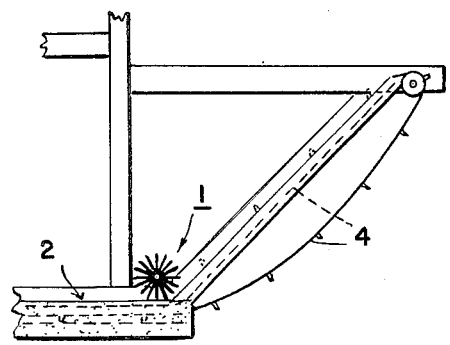
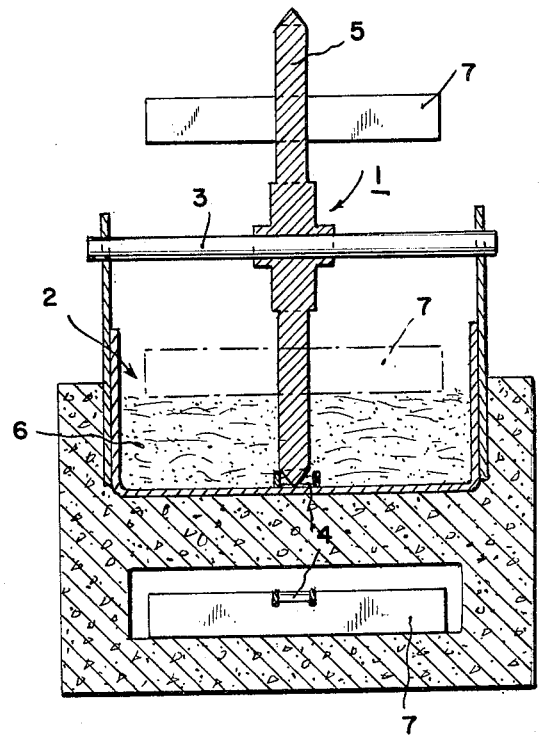
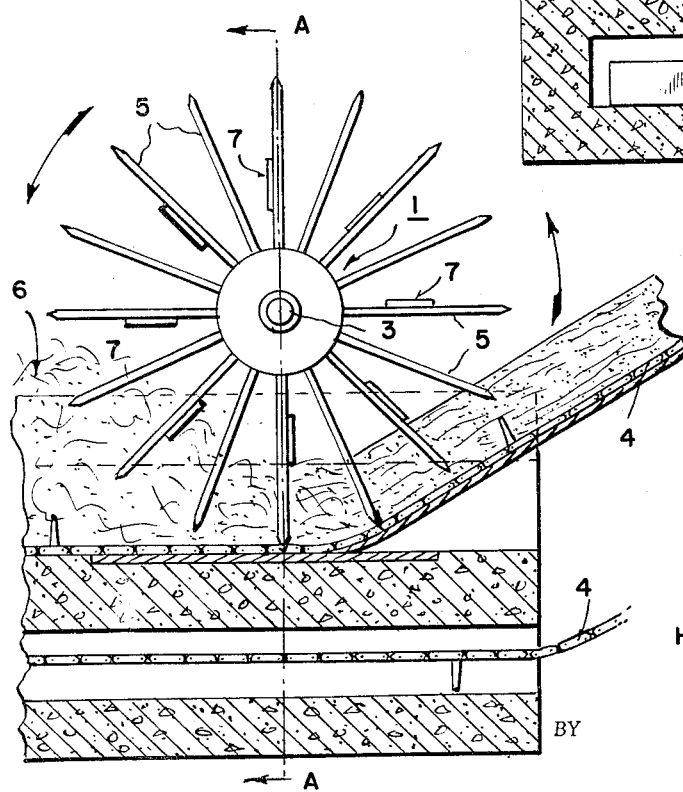
INVENTOR
HENRY R. KREIDER,
BY *J Howard Fleet*
ATTORNEY Patented Jan. 23, 1951

2,539,022

UNITED STATES PATENT OFFICE 2,539,022

STAR WHEEL FOR STABLE CLEANERS

Henry R. Kreider, Wadsworth Township, Medina County, Ohio

Application December 18, 1946, Serial No. 716,904

1 Claim. (Cl. 198—167)

It is a matter of common knowledge of those familiar with the routine work of stock or dairy farming that the handling of the manure and litter requires a great amount of time and labor as well as being one of the most disagreeable jobs of general farming. The purpose in using a mechanical conveyor is to greatly reduce the amount of time and labor as well as to remove much of the unpleasantness of the task. The conveyor in conjunction with the gutter into which the dung and urine drops at the rear of the animal stalls removes the manure from the barn without manual handling. In order for the conveyor to deposit the manure on the manure spreader without necessitating further handling, the conveyor must elevate the material from the end of the stalls. It is highly desirable to have all material including urine removed thoroughly from the barn for the best sanitation. To insure the best distribution over the soil of urine it is necessary to handle urine, dung, and litter all three mixed together in the stable and from the stable to the fields. The greatest difficulty in removing this material by conveyor arises at the point of incline. To obviate this difficulty a star wheel with paddles is utilized at this point. This star wheel has nothing to do with propelling the conveyor chain but merely propels with the chain and performs four very important functions, viz: (1) Holds chain down to floor of gutter, (2) Prevents chain links from moving sidewise, (3) Its spokes pierce material and impel it to start up incline, (4) Paddles attached rigidly to spokes of wheel tamp and compress material into a compact layer so that it moves up incline and does not follow back over the top of the wheel. I have spent a great amount of time experimenting in the past ten years making and trying various types of conveyors for stable cleaning both with double and single chains. I experienced repeated difficulty and even failure until I installed my single chain conveyor and star wheel. This conveyor now is very satisfactory.

Referring to the drawings:

Fig. 1 is a side elevation of gutter, conveyor, and star wheel.

Fig. 2 is a side view of star wheel showing how it operates with iron paddles attached.

Fig. 3 is a sectional view of the star wheel with paddles attached taken on line A—A of Fig. 2.

From Fig. 1 it will be seen that the star wheel 1 is located directly over the point at which the gutter 2 turns upward. The star wheel is supported on shaft 3 journaled in bearings which are supported in side plates. These side plates are firmly anchored by any desired method in order to resist the lifting power of the chain 4 against the spokes 5 as they contact the chain in order to hold the chain and scrapers down and in position in the gutter 2. The star wheel 1 is provided with spokes of flat iron pointed at the outer end of the spoke so that the pointed end will pierce the manure, when it is being scraped along the gutter 2 and contact the chain 4. It is to be noted that if the point of a spoke 5 should contact the driven chain at a link which carries a scraper that the opening of the link is not obstructed by the scraper and will receive the point of the spoke 5. The star wheel 1 is 30" in diameter from tip to tip of spokes. The spokes 5 are spaced far enough apart so that they contact alternate links in the chain 4. This provides space for more manure and litter to pass through at one time without clogging the conveyor at this point. As the wheel 1 turns and the spoke 5 pierces the litter it impels the material to start up the incline.

As the material 6 approaches the wheel 1 it is loose and as it passes under the wheel it remains a jumbled mass which has a tendency to clog. When the material does move on, much of it will follow up over the wheel and become more loose and unmanageable only to be returned to the lower part of the gutter 2 again. For this reason the wheel 1 is equipped as shown in Figs. 2 and 3 with special transverse steel paddles secured to the spokes 7, 3" wide, ¼" thick and about 2" shorter than the width of the gutter, which will not pierce the material but will tamp it down and compress it firmly into the gutter 2 until as it leaves the spokes 5 of the wheel 1 it has formed a compact layer or blanket which easily follows the conveyor up the incline.

What I claim is:

Stable cleaning apparatus comprising a star wheel having spokes pointed at their outer end for piercing stallage and paddles to compress stallage mounted on the spokes inwardly from the pointed end thereof and extending transversely of the spoke, and flexible pulling means passing under the wheel and having elements to engage the spokes of the wheel, the spokes being of sufficient extent to pierce stallage and engage the pulling means, there being sufficient space between the pulling means and the spokes for conveyance of stallage.

HENRY R. KREIDER.

REFERENCES CITED

The following references are of record in the file of this patent:

UNITED STATES PATENTS

| Number | Name | Date |
|---|---|---|
| 1,074,182 | Jorgenson | Sept. 30, 1913 |
| 1,197,060 | Petersen | Sept. 5, 1916 |
| 1,268,088 | Bond | June 4, 1918 |
| 1,335,076 | Peasley | Mar. 30, 1920 |
| 2,171,330 | Custer | Aug. 29, 1939 |